T. F. GLENN.
ARTIFICIAL TOOTH.
APPLICATION FILED AUG. 31, 1915.

1,195,577. Patented Aug. 22, 1916.

UNITED STATES PATENT OFFICE.

THOMAS F. GLENN, OF ARDMORE, PENNSYLVANIA.

ARTIFICIAL TOOTH.

1,195,577.  Specification of Letters Patent.  Patented Aug. 22, 1916.

Application filed August 31, 1915. Serial No. 48,158.

*To all whom it may concern:*

Be it known that I, THOMAS F. GLENN, a citizen of the United States, and a resident of Ardmore, in the county of Montgomery, State of Pennsylvania, have invented certain new and useful Improvements in Artificial Teeth, of which the following is a specification, reference being had to the accompanying drawings.

My invention relates particularly to that class of artificial teeth which are commonly designated as interchangeable facings, and is directed especially to the means for detachably connecting the porcelain tooth body, comprising the facing, to a bridge-piece, plate, or other suitable mounting.

The principal objects of my invention are, to provide a tooth facing which may be readily removed and replaced, and firmly engaged with respect to its mounting by slidably connecting said facing with the mounting, from the gingival end of the mounting; and to provide said mounting and facing with interlocking means so disposed as to enable the facing to pass the root abutment or gum.

Other objects of my invention are, to provide a mounting with a "bite" protecting portion which will not interfere with the engagement and disengagement of the facing.

My invention comprehends a tooth facing having an undercut recess extending gingivally outward in oblique relation to the lingual face of said facing, and arranged to be engaged with a backing having a corresponding projection adapted to enter said recess, serving as a guide and arranged to support said facing in rigid relation with said backing.

My invention also includes all of the various novel features of construction and arrangement hereinafter more definitely specified.

Figure 1:
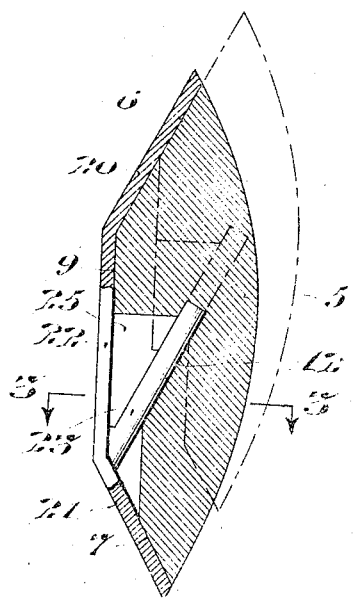
Figure 2:
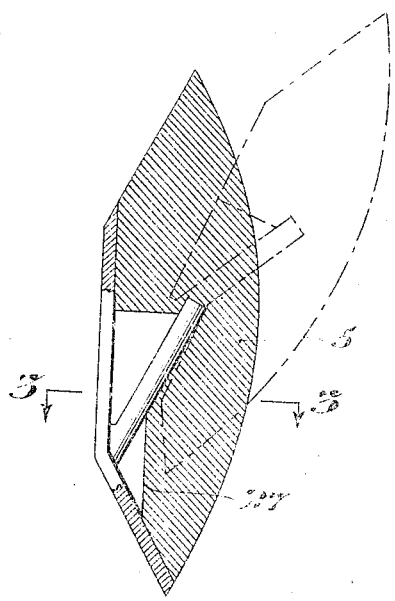
Figure 3:
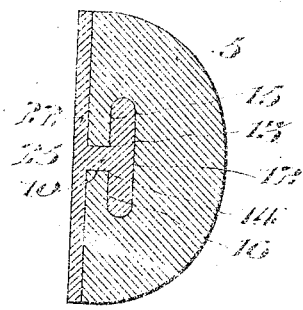

In the accompanying drawings, Figure 1 is a central longitudinal sectional view of a tooth facing and its backing conveniently embodying my invention, a portion of the backing being shown in elevation for convenience of illustration, and the facing being shown in dot and dash lines in an alternate position; Fig. 2 is a central longitudinal sectional view similar to Fig. 1, but showing the backing without the "ridge-lap" wall, the facing being shown in dot and dash lines in another position; and Fig. 3 is a transverse horizontal sectional view of the tooth and backing shown in Figs. 1 and 2, taken on the line 3—3 in each of said figures.

In said figures, the tooth body 5, which is preferably composed of porcelain, has its lingual face formed of relatively angular surfaces, comprising the "ridge-lap" 6, "bite" 7, and intervening lingual surface termed the "shut" 9, said "ridge-lap" and "bite" being disposed in labially oblique relation with respect to the "shut" surface 9. The body of the tooth facing 5 is provided in its lingual face with a recess which may be in the form of an undercut slot or groove 10, extending longitudinally of the facing and comprising a broad, flat cavity 12, having the edges 13 and 14 of the surfaces 15 and 16 of its lingual wall disposed in a plane which extends obliquely outward with respect to the lingual face of said tooth and tends toward its gingival end.

The lingual face of the tooth facing above described is arranged to be clothed by the backing comprising the relatively angular walls 20, 21 and 22, respectively overlying the "ridge-lap", the "bite" and the "shut" surfaces of the lingual face of the tooth facing body 5. Said backing is provided with an anchor bracket or tongue 23, which is arranged to snugly fit the cavity 12 in the tooth facing or body 5, being connected with the backing wall 22 by the relatively narrow web 25, which is preferably arranged to accurately fit the slot or groove 10 in the tooth facing body 5.

The lingual surfaces of the tongue 23 are disposed in oblique relation to the "shut" wall 22 of the backing, in the same general direction as the "ridge-lap", so that the tooth facing 5 may be engaged with said backing by a rectilinear movement from the gingival end of the backing, incisively, from the position shown in dot and dash lines, to the position shown in full lines, wherein the opposing surfaces of the tooth facing and its backing absolutely conform to each other and snugly fit together.

It may in some cases be convenient to dispense with the backing wall 20, as shown in Fig. 2; for instance, where the facing 5 is employed as an intermediate tooth in bridge-work, in which instance the "ridge-lap" 6 of the tooth facing body 5 may abut directly against the gums of the patient.

It may be convenient in some instances where the gums of the patient considerably overhang, to rock the tooth facing 5 into position, as shown in Fig. 2, in which instance the labial wall of the cavity 12 may be cut away, as shown at 27, so as to afford a greater range of movement of the tooth facing 5 with respect to the backing, and thereby facilitate its engagement therewith, as will be obvious from an inspection of said figure.

I am aware that various forms of tooth facings have been devised wherein attempts have been made to so form the facing and backing as to provide a rigid engagement of said facing with said backing, and to provide for protecting the incisive edge of the facing with an inclined "bite" projecting plate or wall, but, so far as I am aware, no such tooth structure has been devised that may be engaged with the backing by a movement of the facing from the gingival end obliquely with respect to the surface adjoining the "bite" surface, and wherein the interlocking means serves as a guide and directs the relative movement of the tooth facing 5 with respect to the backing, in the same general direction as the plane of the "ridge-lap."

It may be noted that although I have shown and described the cavity 12 as broad and flat, it may be of other shapes, and therefore I do not desire to limit my invention to the precise details of construction and arrangement as herein set forth, as various modifications may be made therein without departing from the essential features of my invention as defined by the appended claims.

Having thus described my invention, I claim:

1. A tooth having its lingual face formed of relatively oblique surfaces, comprising the "ridge-lap", "shut" and "bite", and having an undercut recess, the edges of whose lingual wall are disposed in oblique relation to the "shut" surface and extend in the same general direction as the "ridge-lap."

2. In a tooth, the combination with a facing having its lingual face formed of relatively angular surfaces, including a "bite" surface, and an undercut recess in said lingual face having the edges of its lingual wall disposed in a plane oblique to the surface adjoining said "bite" surface and extending labially toward the gingival end, of a backing for said tooth having relatively angular walls conforming to the lingual face of said tooth, and having a tongue projecting into said recess and extending in the same oblique relation to the backing wall as said recess is to the lingual face of the facing.

3. A backing having relatively angular walls arranged to engage the lingual face of a tooth facing, and having a laterally undercut tongue which is arranged to engage a suitable anchor recess in said tooth facing, and which projects obliquely from said backing and in a direction tending labially toward the gingival end.

In witness whereof, I have hereunto set my hand this 30th day of August, A. D., 1915.

THOMAS F. GLENN.

Witnesses:
ROBINSON L. VAILL,
RICHARD H. MENG.